United States Patent [19]

Renz

[11] Patent Number: 4,926,434
[45] Date of Patent: May 15, 1990

[54] GAS LASER EXCITED WITH PULSED MICROWAVE ENERGY

[76] Inventor: Wolfgang Renz, Prof. Angermaier-Ring 18, 8046 Garching, Fed. Rep. of Germany

[21] Appl. No.: 383,047

[22] Filed: Jul. 21, 1989

[30] Foreign Application Priority Data

Jul. 29, 1988 [DE] Fed. Rep. of Germany ....... 3825971

[51] Int. Cl.⁵ .............................................. H01S 3/09
[52] U.S. Cl. ......................................... 372/69; 372/92
[58] Field of Search ...................... 372/69, 82, 83, 86, 372/92

[56] References Cited

U.S. PATENT DOCUMENTS 4,513,424  4/1985  Waynant et al. ..................... 372/69
4,802,183  1/1989  Harris et al. .......................... 372/69

OTHER PUBLICATIONS

"Laser Generation by Pulsed 2.45–GHz Microwave Excitation of $CO_2$", Handy et al., J. Appl. Phys. 49(7), Jul. 1978, pp. 3753–3756.

Primary Examiner—William L. Sikes
Assistant Examiner—Robert E. Wise
Attorney, Agent, or Firm—Hill, Van Santen, Steadman & Simpson

[57] ABSTRACT

In a gas laser excited with pulsed microwave energy, a running gas discharge is generated in a waveguide, this discharge placing the gas in its excited condition, and expiring after migrating through the waveguide. The microwave energy is supplied at one end of the waveguide, and a short-circuit element is disposed at the other end of the waveguide, with an igniter attached in proximity to the short-circuit element so that the gas discharge, and thus the excitation of the laser gas always begins at the end of the waveguide at which the short-circuit element is disposed. This structure is especially suited for $CO_2$ lasers.

10 Claims, 4 Drawing Sheets

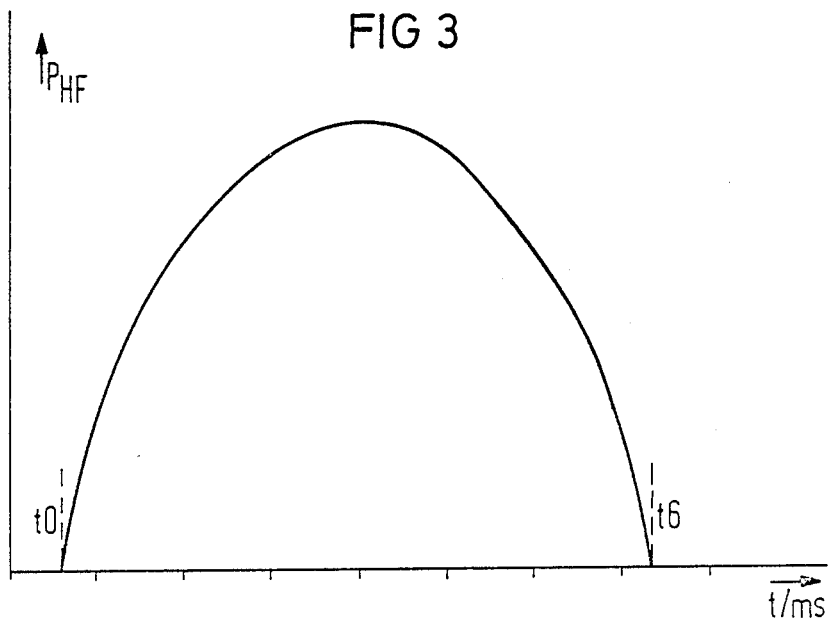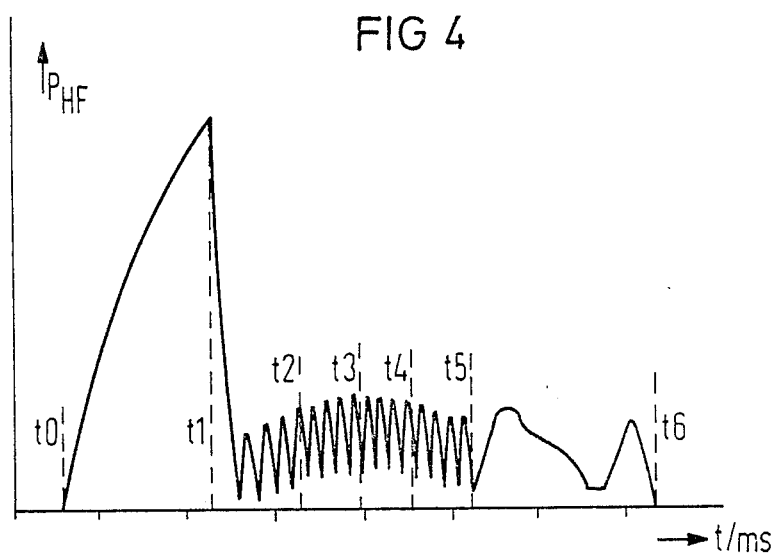

GAS LASER EXCITED WITH PULSED MICROWAVE ENERGY

BACKGROUND OF THE INVENTION

1. Field of the Invention

The present invention is directed to a gas laser excited with pulsed microwave energy of the type having a discharge tube terminated with Brewster windows conducted through the waveguide.

2. Description of the Prior Art

A gas laser is described in an article "Laser Generation by Pulsed 2.45 GHz Microwave Excitation of $CO_2$," Handy et al., Journal of Applied Physics, Vol. 49 (1978), pages 3753–3756. According to this article, a standing microwave discharge is generated in a waveguide, with a glass tube penetrating the waveguide in the transverse direction and serving as a discharge channel for the laser discharge. Profiled wedges of electrically conducting material, which influence the field distribution, are arranged along its longitudinal direction. Excitation of the gas laser in this manner yields relatively low intensity values, because the glow discharge required for the excitation of the laser can be produced only in a relative short region of the waveguide. The achievable discharge zone is shorter than a half-wave of the exciting microwave energy in the waveguide. This is also the reason that the discharge channel in this known device is arranged transversely relative to the waveguide. An attempt is made in this structure to maintain the discharge in the region of the waveguide by specially shaping the wedges. This embodiment can realize only an extremely short excitation zone for the laser because of the limitations in the dimensions of the waveguide which must be observed. The laser energy obtainable in this manner is therefore extremely low.

SUMMARY OF THE INVENTION

It is an object of the present invention to provide a gas laser excited with pulsed microwave energy having a gas discharge tube extending through the laser waveguide which achieves an increase in the laser power without changing the dimensions of the waveguide.

This and other objects are achieved in accordance with the principles of the present invention in a gas laser wherein the discharge tube extends in a longitudinal direction of the waveguide, with the gas discharge tube being connected to a gas supply at ports disposed in the proximity of Brewster windows which respectively close each end of the discharge tube. The waveguide has a substantially straight region and is terminated at one end by a short-circuit element and has an input for the microwave energy at an opposite end. The distance between the short-circuit element and the microwave input is greater than one-half of the wave length of the microwave signal. An igniter is disposed in the straight region of the waveguide, at the end at which the short-circuit element is disposed. The distance between the igniter and the short-circuit element is selected so that the igniter is disposed in the region of high electrical field strength of the microwave energy reflected at the short-circuit element. This insures that ignition of the glow discharge will always take place in the region of the igniter.

In the structure disclosed herein, a glow discharge is ignited in the discharge tube at the end thereof closest to the short-circuit element. This discharge migrates through the discharge tube and remains standing in the proximity of the microwave feed until the intensity of the microwave energy has decreased below a threshold for the gas discharge.

As a consequence of the dimensioning of the components of the laser, and also dependent upon the gas selection, the excited condition of the laser gas can be maintained after the gas discharge zone has migrated away. The laser discharge ignites by self-excitation as soon as the required length of the discharge tube is filled with excited gas, and does not expire until after the microwave discharge has expired.

In one embodiment of the invention, the waveguide has end sections disposed at opposite ends of the straight portion with the end sections being joined to the straight portions at angle. The waveguide may have a rectangular profile, and the discharge tube is conducted through a wall of each end section. A microwave feed in a known manner and the application of a short-circuit slide to the respective end faces are thereby possible in a simple manner. In this embodiment, the gas discharge is formed in the entire region of the discharge tube disposed inside the waveguide. The conditions necessary for the appearance of a glow discharge are not satisfied outside of the discharge tube. The igniter is thus preferably disposed in the straight portion of the waveguide in proximity to the location where the straight portion is joined to the end section in which the short-circuit element is disposed. The igniter is preferably in the form of a screw or tapered tip which projects into the waveguide.

Outside of the end sections, the discharge tube is surrounded with a metal tube shield over a portion of its length, the metal tube being joined to the waveguide in HF-tight fashion. This shields the microwave energy from the environment.

The discharge tube is preferably attached to the surface of a ridge which faces toward the symmetry axis of the waveguide. The laser is preferably a $CO_2$ laser, because $CO_2$ stays in its excited condition for a relatively long timespan. As used herein, the term "$CO_2$ laser" includes those lasers having $CO_2$ and the standard additives of further gases, such as nitrogen and helium.

The waveguide is preferably a fundamental mode waveguide with a rectangular cross-section, with a distance between the microwave input and the short-circuit element being greater than or equal to $\lambda_h$, with $\lambda_h$ being the wavelength of the microwave radiation in the waveguide.

An especially high energy exploitation and a quasi-continuous operation is achieved in an embodiment wherein the laser gas having a long timespan in its excited condition is used, for example, CO or $CO_2$, and wherein the pulse width and pulse amplitude of the microwave radiation are selected so that the running time of the microwave gas discharge through the waveguide is shorter than the timespan of the excited condition of the laser gas. In this embodiment, the entire length of the waveguide is exploited for the excitation of the laser gas, and the glow discharge is immediately quenched after the glow discharge has migrated through the waveguide, so that a very fast re-ignition by a new pulse is possible. The laser discharge continues even after expiration of the glow discharge, and ignition of the new pulse is still possible before the quenching of the laser discharge, thus achieving a quasi-continuous laser operation.

DESCRIPTION OF THE DRAWINGS

FIGS. 3 through 6 are graphs illustrating the operation of the waveguide of FIG. 1.

DESCRIPTION OF THE PREFERRED EMBODIMENTS

Figure 1:
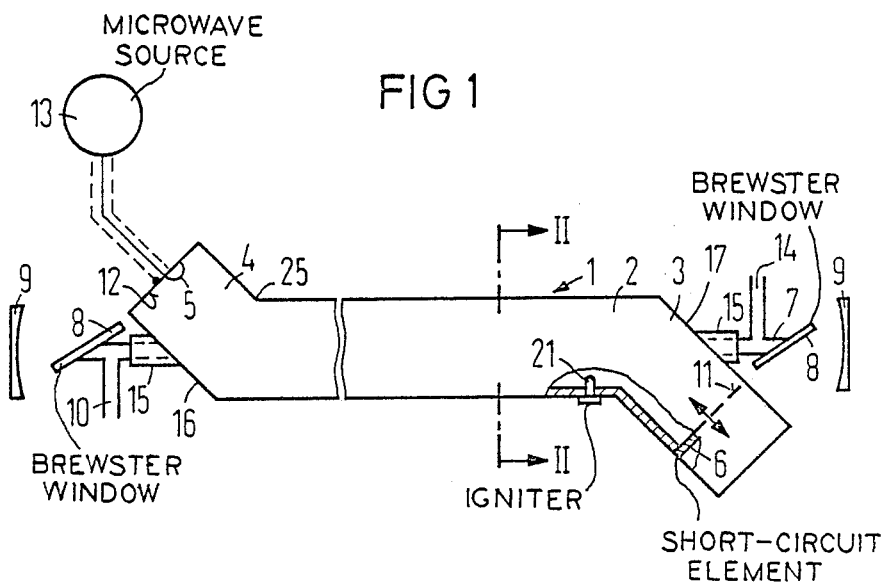
FIG. 1 is a side schematic view, partly broken away, of a gas laser constructed in accordance with the principles of the present invention.

As shown in FIG. 1, a waveguide 1 has a central section 2 which is substantially straight, and two end sections 3 and 4 proceeding at an angle form the straight region 2. The end sections 3 and 4 have respective end faces 11 and 12. The end face 11 is formed by a short-circuit slide 6. A connector or input 5 for microwave feed is attached to the end face 12, and is also connected to a microwave generator 13.

A discharge tube 7 extends through the waveguide 1 in the longitudinal direction of its straight portion 2, and emerges from the waveguide 1 through respective walls 16 and 17 of the angled end sections 3 and 4. Electrically conductive tube sections 15 are disposed adjoining the walls 16 and 17 and envelope the discharge tube 7. The tube sections 15 are connected RF-tight to the waveguide 1, and function to shield the microwave energy from the environment.

The discharge tube 7 is closed at both ends with Brewster windows 8. Resonator mirrors 9 arranged coaxially with the discharge tube 7, complete the laser resonator. Gas connections 10 and 14 enable the constant feed of fresh laser gas, with gas deliver preferably ensuing via the connection 10 at the same side of the microwave feed. This results in a particularly good efficiency of the laser. A mixture of He, $N_2$ and $CO_2$ in the ratio of 75:15:10 is suitable as the laser gas.

An igniter 21 is disposed in the straight portion 2 of the waveguide 1 at the side nearest the short-circuit element 6. The igniter 21 is preferably in the form of a sharply tapered element or screw which projects into the waveguide 1. The igniter 21 may have any shape edge or tip as long as the shape causes an increase in the field strength in this region which is greater than any increase in the field strength at other locations in the waveguide, for example at the bend 25 at the connection of the other end section 4. The short-circuit element 6 is adjusted so that the igniter 21 lies in the region of a field maximum of the microwave radiation generated in the waveguide. The igniter 21 insures that the glow discharge, when the high-frequency pulse is applied, always ignites in the region closest to it. This insures that ignition will occur at the end of the waveguide 1 farthest away from the microwave feed.

The glow discharge initially occurs in a volume which is smaller than half the wave length of the microwave radiation in the waveguide. After ignition of the glow discharge, energy is taken from the microwave radiation and the ignition behaviour is modified such that the discharge detaches from the region of the igniter 21 after a slight rise in the momentary field strength, and moves toward the other end of the waveguide 1, i.e., toward the connector 5 for the microwave feed. Given a corresponding gas selection, the portion of the gas volume no longer subjected to the gas discharge because of this motion, remains in an excited condition. The excited gas column grows, and the intensification for stimulated emission grows as well, until after a certain minimum length is covered, laser emission occurs. This laser emission consumes a portion of the excited gas for a relatively long time, so that the laser intensity constantly increases upon passage of the glow discharge through the waveguide 1, until the gas discharge arrives at the opposite end of the waveguide 1 or, dependent upon dimensioning a saturation is reached.

Figure 5:
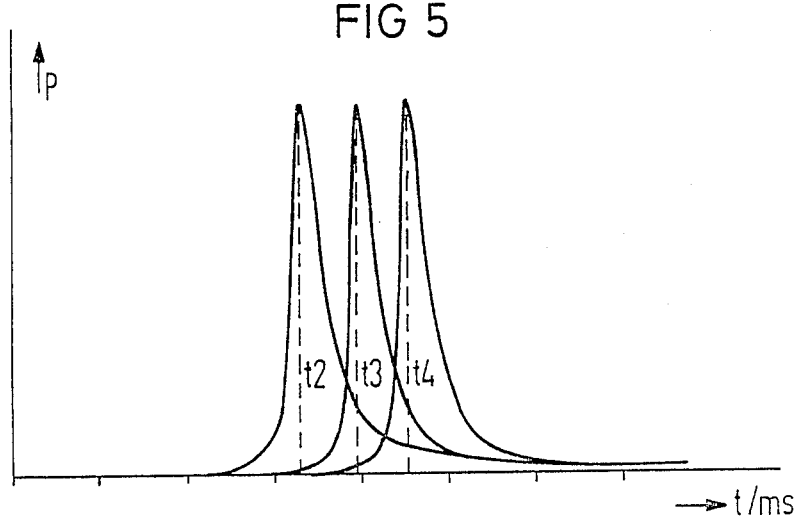

FIG. 3 shows the chronological curve of the forward microwave power at the beginning of the waveguide 1 given pulsed excitation. FIG. 4 shows the reflected power of the same pulse excitation sequence. One can immediately see that a considerable part of the excitation power has been absorbed in the glow discharge. The light intensity P was measured at various locations of the waveguide 1, which is one meter long. The curves for the light intensity P over time are shown in FIG. 5 for three measuring locations. These measuring locations are at a distance of 25 cm, 50 cm and 75 cm from the end face 11 of the waveguide 1. The first measuring location is thus reached at a time $t_2$, the second measuring location is reached at a time $t_3$, and the third measuring location is reached at a time $t_4$. It can clearly been seen from these diagrams that the glow discharge moves from the end face 11 of the waveguide to the other end face 12 and covers only a small portion of the waveguide. The intensity of the glow discharge remains approximately constant.

Figure 6:
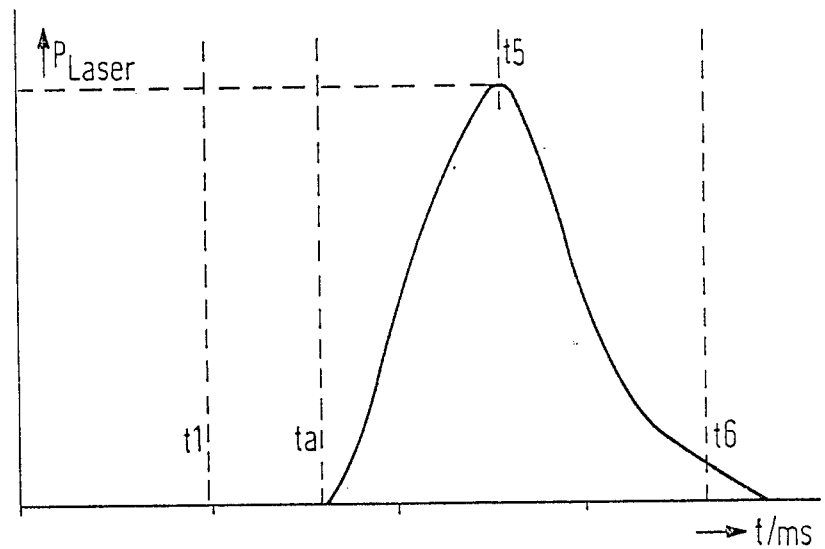

After the excitation of a portion of the gas in the discharge tube which is sufficient to cause spontaneous laser emission, the laser discharge beings at a time $t_a$. The laser intensity $P_{Laser}$ increases steadily until the discharge reaches the end face 12 of the waveguide at time $t_5$. The laser discharge then decays, but continues to exist after the disappearance of the exciting microwave pulse. This is clearly seen in FIG. 6, in which the curve of the laser power extends beyond the value $t_6$ on the time axis, i.e., the end of the excitation pulse, with a considerable remaining intensity.

The glow discharge expires as soon as the microwave power falls below a threshold. After expiration of the glow discharge, it can be re-ignited in the region of the igniter 21, and the procedure begins again. When the laser gas having a long timespan in its excited condition (for example CO or $CO_2$) is used, and when the pulse width ($t_6$ to $t_0$) and the pulse amplitude of the microwave power ($P_{HF}$) are selected such that the running time of the glow discharge through the waveguide 1 is shorter than the timespan of the excited condition of the laser gas, then the entire length of the waveguide 1 is exploited for lasing.

Figure 2:
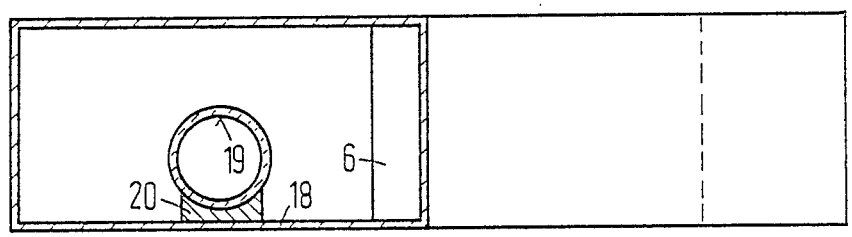
FIG. 2 is a sectional view of the gas laser of FIG. 1 taken along line II—II.

A quasi-continuous operation of the laser is achieved if approximately square-wave microwave pulses are used, and wherein their pulse width ($t_6-t_0$) is selected less than or equal to the running time of the glow discharge through the waveguide 1, and wherein the pulse repetition rate is selected sufficiently high that an expiration of the gas discharge barely occurs at the time interval between the pulse, i.e., between $t_6$ of the first pulse and $t_0$ of the second pulse. Given pulses that rise relatively flatly, this condition can also be satisfied by pulses which slightly overlap. A waveguide having a cross-section as shown in FIG. 2 can be used as the waveguide 1. This waveguide may be a conventional waveguide having the designation R26, i.e., the dimensions of the cross-section inside the waveguide are 86.36 mm×43.18 mm. Such a waveguide enables oscillation in the fundamental mode given a microwave frequency of 2.45 GHz. A discharge tube consisting of $Al_2O_3$ ceramic having an inside diameter of 17 mm is preferably used with such a waveguide, with the distance from the inside wall 19 of the discharge tube 7 to the wall interior 18 of the waveguide 1 is approximately 5 mm. The discharge tube 7 is supported by a ridge 20 within the waveguide 1. The pulse width of the microwave energy is 6 msec. The curves shown in FIGS. 3 through 6 can be obtained with such a waveguide having a length of about one meter.

Figure 7:
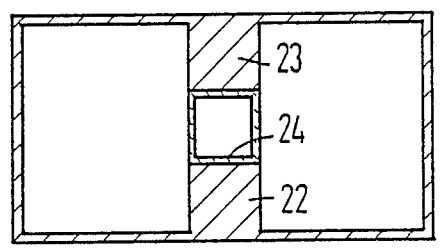
FIG. 7 is a sectional view of a further embodiment of a gas laser constructed in accordance with the principles of the present invention.

An adaptation of the field distribution in the propagation direction of the wave is not required given the inventive principal of running discharge. For example, it is possible to use a waveguide having a cross-section as shown in FIG. 7. This waveguide providing a significantly more uniform field destruction and better heat elimination than the arrangement shown in FIG. 2. In the embodiment of FIG. 7, a rectangular discharge channel consisting of non-conductive material, preferably $Al_2O_3$ ceramic, is situated between two ridges 22 and 23 attached to opposite sides of the waveguide 1.

Although modifications and changes may be suggested by those skilled in the art it is the intention of the inventor to embody within the patent warranted hereon all changes and modifications as reasonably and properly come within the scope of his contribution to the art.

I claim as my invention:

1. A gas laser for use with a source of pulsed microwave energy comprising:
   a sealed waveguide having a straight section having a longitudinal axis;
   a short-circuit element terminating one end of said waveguide;
   a microwave input port adapted for connection to said pulsed microwave source and disposed in an end face at an opposite end of said waveguide with the distance between said short-circuit element and said end face being greater than one-half the wavelength of the microwaves from said pulsed microwave energy source;
   a gas discharge tube extending through said straight section of said waveguide along said longitudinal axis and filled with laseable gas, the gas excited, from said waveguide, said gas discharge tube closed at opposite ends with Brewster windows and having a port adapted for connected to a gas source at each of said opposite ends; and
   an igniter disposed in said straight section of said waveguide at an end thereof closest to said short-circuit element, said igniter being disposed a distance from said short-circuit element coinciding with a region of high electrical field strength of the microwave energy reflected by said short-circuit element so that ignition of the discharge in said gas discharge tube will occur in the region of igniter.

2. A gas laser as claimed in claim 1, wherein said waveguide further includes an end section at each end of said straight section disposed at an angle with respect to said straight section, with one of said end section containing said end face and the other of said end sections containing said short-circuit element.

3. A gas laser as claimed in claim 2, wherein said waveguide has a rectangular cross-section.

4. A gas laser as claimed in claim 2, wherein said gas discharge tube extends through said end sections, and further comprising an electrically conductive tube covering said gas discharge tube at each of said end sections, said electrically conductive tube being connected to said waveguide in an HF-tight fashion.

5. A gas laser as claimed in claim 1, wherein said igniter has a tapered tip projecting into said waveguide.

6. A gas laser as claimed in claim 1, wherein said waveguide has an axis of symmetry, and further comprising a ridge securing said gas discharge tube to the waveguide with said gas discharge tube mounted on a surface facing toward said axis of symmetry.

7. A gas laser as claimed in claim 1, wherein said waveguide is a fundamental mode waveguide having a rectangular cross-section, and wherein the distance between said end face and said short-circuit element is greater than or equal to the wavelength of the microwaves from said pulsed microwave energy source.

8. A gas laser as claimed in claim 1, wherein said laseable gas has a timespan of the excited condition so that, for a given pulse width and pulse amplitude of said microwave energy, the running time of the microwave gas discharge through said waveguide is shorter than said timespan of the excited condition of said laseable gas.

9. A gas laser as claimed in claim 8, wherein said laseable gas is a mixture containing $CO_2$.

10. A gas laser as claimed in claim 1, wherein said pulse microwave energy source generates approximately square-wave microwave pulses having a pulse with and a pulse repetition frequency, and wherein the effective length of said gas discharge tube in said waveguide, and the gas in said gas discharge tube are selected so that the running time of the gas discharge through the waveguide is greater than or equal to the duration of the pulse width of said microwave pulses and such that expiration of said gas discharge occurs substantially coincident with the time interval between said microwave pulses.

* * * * *